US011298720B1

(12) United States Patent
Lee et al.

(10) Patent No.: US 11,298,720 B1
(45) Date of Patent: Apr. 12, 2022

(54) APPARATUS FOR EXTRUSIVE DISPENSING OF WORK MATERIAL HAVING ADAPTIVELY ADJUSTABLE CONTAINMENT VESSEL RETENTION

(71) Applicant: PATENT & INVESTMENT LLC, Jessup, MD (US)

(72) Inventors: Albert Lee, Clarksville, MD (US); Brian Glass, West Friendship, MD (US)

(73) Assignee: Patent & Investment LLC, Jessup, MD (US)

( * ) Notice: Subject to any disclaimer, the term of this patent is extended or adjusted under 35 U.S.C. 154(b) by 26 days.

(21) Appl. No.: 16/839,959

(22) Filed: Apr. 3, 2020

(51) Int. Cl.
*B05C 17/005* (2006.01)
*B05C 17/01* (2006.01)
*F16L 3/10* (2006.01)

(52) U.S. Cl.
CPC .... *B05C 17/0052* (2013.01); *B05C 17/00553* (2013.01); *B05C 17/01* (2013.01); *F16L 3/1008* (2013.01)

(58) Field of Classification Search
CPC ........ B05C 17/00516; B05C 17/00583; B05C 17/00596; B05C 17/0052; B05C 17/00553; B05C 17/01; F16L 3/1008; G01F 11/026; G01F 11/286
USPC ................................. 222/137, 326, 391, 327
See application file for complete search history.

(56) References Cited

U.S. PATENT DOCUMENTS

| 266,007 | A | | 10/1882 | Badger |
| 2,731,176 | A | | 1/1956 | Crewe |
| 3,389,838 | A | * | 6/1968 | Morra .................... B05B 7/0433 222/630 |
| 3,399,583 | A | | 9/1968 | Hall |
| 3,443,725 | A | | 5/1969 | Lawhorn |
| 3,767,085 | A | | 10/1973 | Cannon et al. |
| 3,774,809 | A | * | 11/1973 | Bratton ............. B05C 17/00553 222/137 |
| 3,987,939 | A | | 10/1976 | Pedone, Jr. et al. |
| 4,802,703 | A | | 2/1989 | Gabel |
| 5,228,605 | A | * | 7/1993 | Schlichenmaier ........................... B05C 17/00589 222/327 |

(Continued)

FOREIGN PATENT DOCUMENTS

CN 207469692 U 6/2018

*Primary Examiner* — Charles P. Cheyney
(74) *Attorney, Agent, or Firm* — Rosenberg, Klein & Lee

(57) ABSTRACT

An applicator apparatus is provided for extrusively dispensing work material from a containment vessel. A base portion includes a handle and a control member. A cage portion coupled to the base portion defines a receiving compartment for at least one containment vessel. The cage portion is provided with a proximate end disposed adjacent the base portion and an intermediate section extending longitudinally therefrom to a distal end. A drive portion coupled to the base portion is actuated responsive to the control member for driving extrusion of the work material from the containment vessel. A clasp portion displaceably coupled to the cage portion is displaceable relative to the cage portion between first and second positions, where the second position is disposed along the intermediate section of the cage portion. The clasp portion forms a cuff about the receiving compartment of the cage portion for laterally retaining the containment vessel received therein.

20 Claims, 9 Drawing Sheets

(56) References Cited

U.S. PATENT DOCUMENTS

| | | | |
|---|---|---|---|
| 5,240,141 A | | 8/1993 | Blette |
| 5,390,831 A | | 2/1995 | Schneider |
| 5,626,263 A | * | 5/1997 | Lii .......................... B05C 17/01 |
| | | | 222/192 |
| 5,779,675 A | * | 7/1998 | Reilly ............... A61M 5/14546 |
| | | | 604/131 |
| 5,839,612 A | * | 11/1998 | Burke ................. B05C 17/0103 |
| | | | 222/333 |
| 5,875,928 A | | 3/1999 | Muller et al. |
| 6,488,180 B1 | * | 12/2002 | Bayat ............... B05C 17/00553 |
| | | | 222/137 |
| 7,905,375 B2 | | 3/2011 | Schneider et al. |
| 8,584,907 B2 | * | 11/2013 | Schneider ................. B25F 5/02 |
| | | | 222/333 |
| 9,027,796 B1 | | 5/2015 | Leitch |
| 10,301,832 B1 | * | 5/2019 | Shoberg ................. E04F 21/08 |
| 10,328,452 B2 | | 6/2019 | Levand et al. |
| 2011/0089193 A1 | * | 4/2011 | Minegishi ............... B65D 75/58 |
| | | | 222/102 |
| 2017/0259297 A1 | * | 9/2017 | Levand ............... B05C 17/0123 |
| 2018/0009595 A1 | * | 1/2018 | Witcher ............. B65D 83/0066 |
| 2018/0333742 A1 | | 11/2018 | Lee, III |
| 2019/0143365 A1 | * | 5/2019 | Roth ................ B05C 17/00576 |
| | | | 222/379 |

* cited by examiner ated by push rods which are driven coaxially into the cartridges from the rear to force dispensing. By their engagement of the cartridges in this manner, the push rods themselves provide some rear holding function.

APPARATUS FOR EXTRUSIVE DISPENSING OF WORK MATERIAL HAVING ADAPTIVELY ADJUSTABLE CONTAINMENT VESSEL RETENTION

BACKGROUND OF THE INVENTION

The subject apparatus is generally directed to an applicator for extrusively dispensing work material from one or more containment vessels. More specifically, the subject apparatus provides for an applicator having adaptively adjustable retention of one or more containment vessels from which the work material is extrusively dispensed.

Various applicators for the extrusive dispensing of work material in various applications across numerous trades and fields are known in the art. They include for instance epoxy guns, caulking dispensers, and the like. Such applicators are often of a configuration which receives and holds one or more removable containment vessels pre-filled or pre-charged with a desired amount of material for dispensing by extrusion directly therefrom. Containment vessels may come in various types and configurations, often with a shell-like longitudinally extended outer cartridge structure having some degree of rigidity to guard against inadvertent extrusion of the material inside from external impact or force.

Applicators conventionally incorporate some known measures to hold such cartridges in place for proper dispensing to occur. Typically, the applicator provides measures towards the front for holding a dispensing tip which emerges forward from singular cartridges or multi-cartridge packs, and measures further back for holding a back end or rearmost part of the cartridge/cartridges. In certain known applicators the cartridges, when properly loaded into the applicator, are actuated by push rods which are driven coaxially into the cartridges from the rear to force dispensing. By their engagement of the cartridges in this manner, the push rods themselves provide some rear holding function.

Additional rearward measures are provided in certain known applicators by way of a stabilizing plate defining variously size grooves in which retentively receive the rearmost edges of the cartridges' outer body, or shell. To accommodate cartridges of cylindrical shape, for example, a disk-like stabilizing plate formed with variously sized arcuate grooves (for the ends of cylindrical shells) is employed to receptively engage the terminal rear edges of correspondingly sized cartridges. In order to change to different mix types or to different mix volume ratios, or to otherwise adapt to the variously configured cartridges available on the market (i.e., having different diameters), cartridges may then be swapped out as needed without loss of rearward hold. Accordingly, the same applicator may be used for numerous different dispensing applications requiring different cartridge sizes and configurations.

Such frontal and rearward support and hold of cartridges loaded into a given applicator, however, may not provide adequate protection against one or more of the cartridges dislodging when the system is upended or subjected to disruptive, erratic handling during use. Even if the cartridge(s) is not dislodged enough to escape from the applicator, its alignment with a push rod may be disturbed enough to impede proper dispensing operation. Use of measures like stabilizing plates at the back end of the cartridges in conjunction with frontal support at or near the dispensing tip portion may not provide ample securement and/or support of the cartridges at their intermediate portions.

The problem may be exacerbated given the prevalence of those applicators and contexts with cartridge receiving structures trending towards more skeletal frames to yield more lightweight and versatile. Still, the problem also plagues those applicators and contexts where cartridge receiving structures may not be fully skeletal in form, yet may have substantial portions which are open enough (such as trough-like receiving structures with open upper or side access) to expose the received cartridge(s) to possible release, misalignment, or dislocation.

There is therefore need for an applicator apparatus which maintains ample intermediate securement and/or support for one or more cartridges or other such containment vessels received therein during use. There is a need for such applicator apparatus having adaptively adjustable retention of the one or more received containment vessels, such that simply yet reliable securement and/or support therefor may be consistently maintained during the course of use.

SUMMARY OF THE INVENTION

It is an object of the present invention to provide an applicator apparatus that maintains consistent intermediate securement and/or support for one or more containment vessels received therein during use.

It is another object of the present invention is to provide an applicator apparatus having adaptively adjustable retention of one or more received containment vessels.

It is yet another object of the present invention is to provide an applicator apparatus which maintains consistent intermediate retention of one or more containment vessels received therein during the course of use.

These and other objects are attained in an applicator apparatus for extrusively dispensing work material from a containment vessel received thereby, comprising a base portion including a handle and a control member. A cage portion is coupled to the base portion, which cage portion defines a receiving compartment for at least one containment vessel. The cage portion is provided with a proximate end disposed adjacent the base portion and an intermediate section extending longitudinally therefrom to a distal end. A drive portion is coupled to the base portion, where the drive portion is actuated responsive to the control member for driving extrusion of the work material from the containment vessel. A clasp portion displaceably coupled to the cage portion is displaceable relative to the cage portion between first and second positions, where the second position is disposed along the intermediate section of the cage portion. The clasp portion forms a cuff about the receiving compartment of the cage portion for laterally retaining the containment vessel received therein.

In certain though not necessarily all embodiments of the present invention, an applicator apparatus is provided for extrusively dispensing work material from a containment vessel retained in adaptively adjustable manner thereby, comprising a base portion including a handle and a control member. A cage portion is coupled to the base portion. The cage portion defines a receiving compartment for at least one containment vessel, and includes a proximate end disposed adjacent the base portion and an intermediate section extending to a distal end longitudinally therefrom. A drive portion is coupled to the base portion, with the drive portion being actuated responsive to the control member for driving extrusion of the work material from the containment vessel. A clasp portion slidably is coupled to the cage portion to be displaceable between first and second positions on the cage portion, where the second position is disposed along the intermediate section of the cage portion. The clasp portion forms a cuff substantially looped about the receiving compartment of the cage portion for laterally retaining the containment vessel received therein. The clasp portion is reconfigurable between closed and open configurations, and the clasp portion in the closed configuration is releasably locked to maintain resiliently biased engagement of the cage portion.

In certain other embodiments of the present invention, there is provided an applicator apparatus having continually adjustable retention of a containment vessel for extrusively dispensing work material therefrom. The applicator apparatus comprises a base portion including a handle and a control member. A cage portion is coupled to the base portion, and the cage portion defines a receiving compartment for at least one containment vessel. The cage portion forms an open frame structure including a pair of frame members defining the receiving compartment therebetween, each of the frame members extending longitudinally from a proximate end disposed adjacent the base portion to terminate at a distal end. A drive portion is coupled to the base portion, with the drive portion being actuated responsive to the control member for driving extrusion of the work material from the containment vessel. A clasp portion is slidably coupled to the cage portion to be displaceable between first and second positions on the cage portion, the second position being disposed along the intermediate section of the cage portion. The clasp portion is reconfigurable between closed and open configurations, and it the closed configuration the clasp portion is releasably locked to maintain resiliently biased engagement of the cage portion. The clasp portion includes first and second collar members detachably coupled to one another to capture the cage portion therebetween, with the first and second collar members cooperatively forming a cuff about the receiving compartment of the cage portion for laterally retaining the containment vessel received therein. At least the first collar member includes a body section extending between first and second clip sections, and the body section defines a bulbous profile configured to traverse the receiving compartment while extending laterally about the containment vessel received therein. At least the first clip section includes a leaf spring extension resiliently biased to press against the cage portion for frictional resistance when the clasp portion is in the closed configuration.

DETAILED DESCRIPTION OF THE PREFERRED EMBODIMENTS

Figure 1:
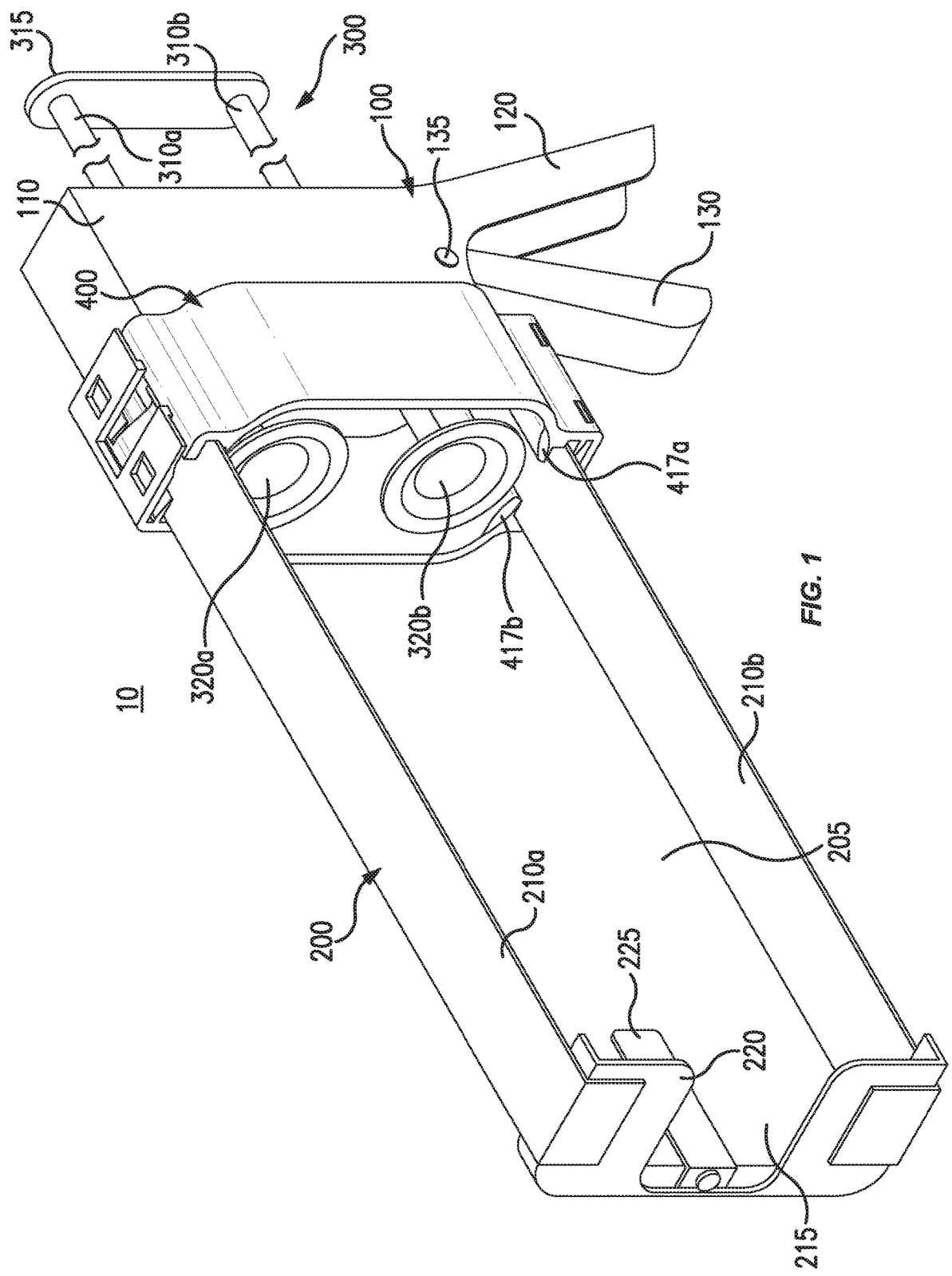
FIG. 1 is a perspective view of an apparatus formed in accordance with one exemplary embodiment of the present invention, illustratively shown with a portion thereof disposed in one adjustable position.

Reference will now be made in detail to exemplary embodiments, which are illustrated in the accompanying drawings, wherein like reference numerals refer to the like elements throughout. Illustrative embodiments are described below in order to explain the disclosed apparatus with reference to the various figures shown in the drawings for certain exemplary embodiments and certain sample applications.

The subject applicator apparatus receives one or more containment vessels and operates to extrusively dispense work material therefrom. The applicator apparatus includes simple yet secure retention measures for maintaining adjustable intermediate support for the containment vessels within the apparatus. The containment vessel may be of any suitable type and configuration known in the art, and typically comes pre-filled or pre-charged with the given work material. Some containment vessels are combined with one another to provide concurrent dispensing of multiple types of materials therefrom, often in commingled, mixed form.

The present invention is not limited to an applicator apparatus that works with containment vessels of any one particular type or configuration, but it does provide for notable advantage for use with containment vessels having some degree of rigidity in its outer body. More specifically, the subject applicator apparatus is particularly well suited to provide adaptively adjusted support for securely retaining the intermediate portion of one or more containment vessels received for use therein.

In the embodiments shown, for instance, the containment vessels illustrated are of the tubular cartridge type, wherein a tubular outer body is pre-filled with a given work material or a component of the given work material (for mixture with another component). A displaceable plug or backing is disposed within the outer body. When the applicator apparatus is actuated, a plunger is extended to drive the plug/backing axially within the outer body. As the backing advances, it compresses the material-containing volume within the outer body to squeeze the material out—typically through a dispensing tip which converges to a terminal opening.

The longitudinally extended tubular outer body is normally pre-filled with a given work material, which is dispensed as the backing is driven forward. As the backing drives forward, the weight of the work material remaining in the tubular outer body is increasingly concentrated further forward. Hence, the point of optimal lateral support for the containment vessel is increasingly advanced forward as the work material is dispensed. In accordance with certain aspects of the present invention, the subject applicator apparatus provides for containment vessel retention which is adaptively adjustable such that the point of retention may be displaced as needed along the length of the containment vessel to maintain optimal lateral support for the same during use. In accordance with certain other aspects of the present invention, the subject applicator apparatus provides for such adaptively adjustable retention in a highly secure and stable yet simple structure which may be conveniently opened and closed to releasably capture one or more containment vessels received by the applicator apparatus.

Figure 2:
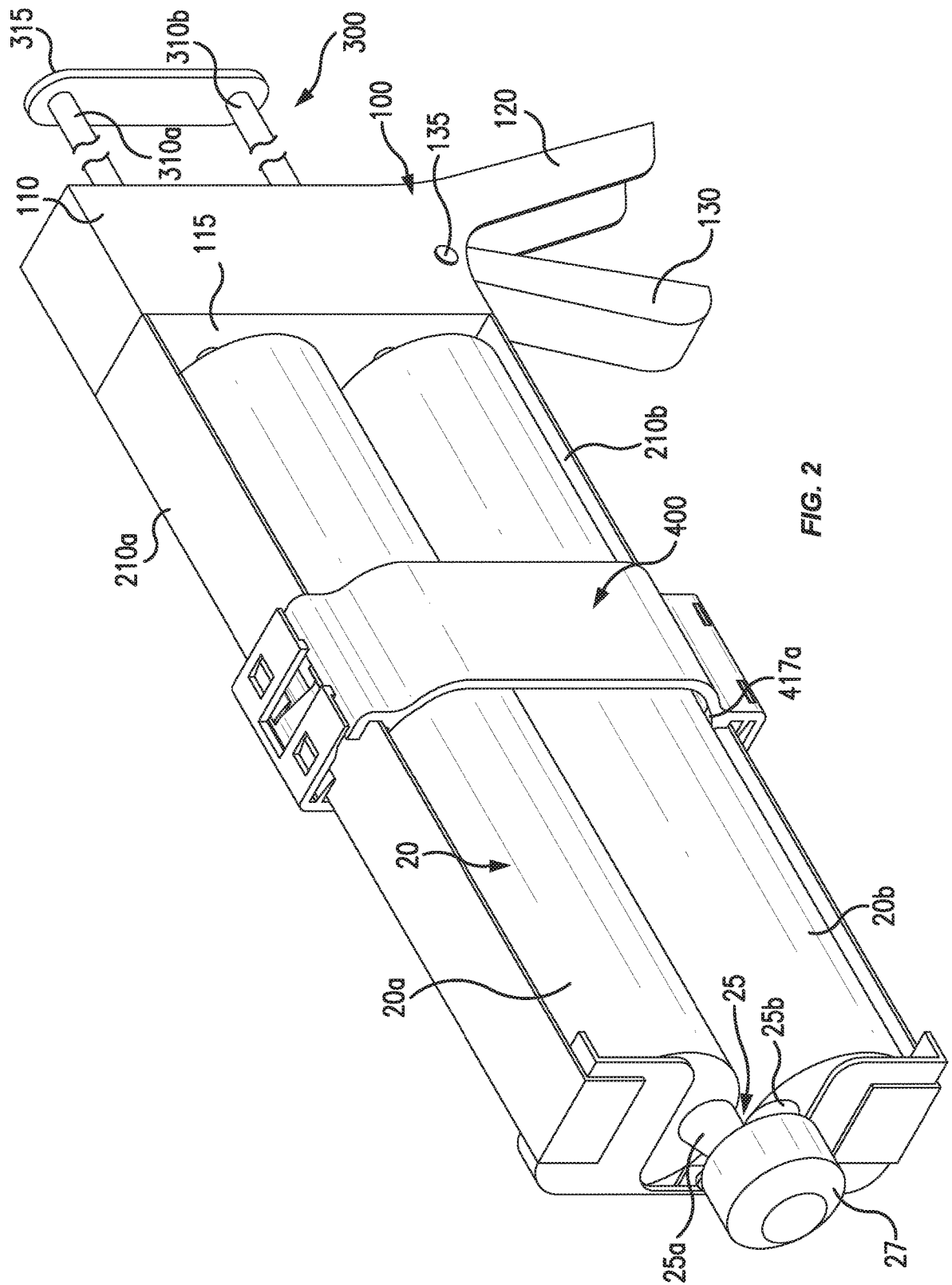
FIG. 2 perspective view of the embodiment of FIG. 1, illustratively shown loaded with one example of multiple containment vessels, and with a portion thereof disposed in another adjustable position.
Figure 3:
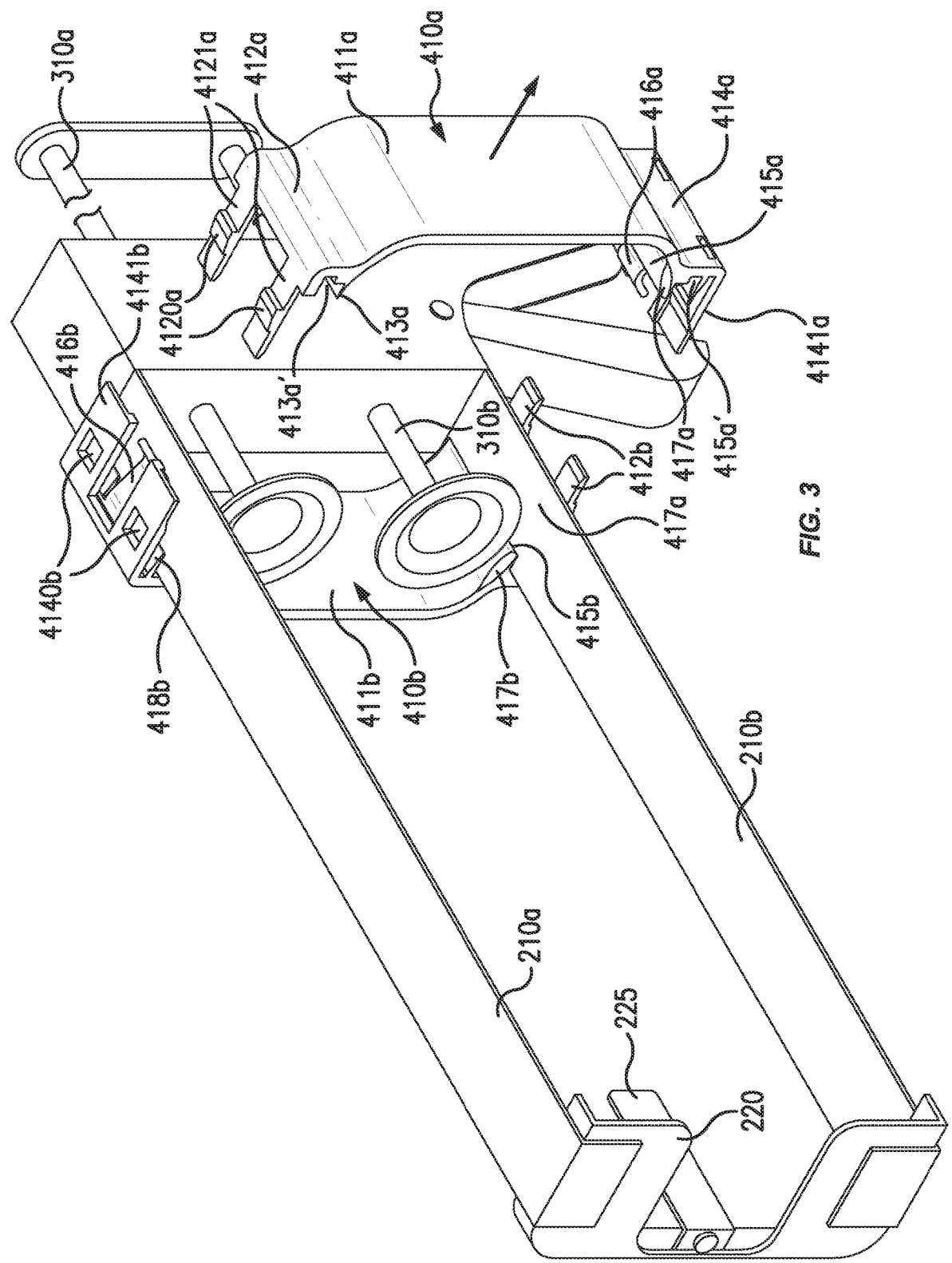
FIG. 3 is a partially exploded perspective view of the embodiment as shown in FIG. 1, illustrating a detachable interlocking of members forming a portion thereof.

Referring now to FIGS. 1-3, there are shown various views of an applicator apparatus 10 formed in accordance with but one of numerous exemplary embodiments of the present invention. In this embodiment, apparatus 10 is configured to receive two containment vessels charged with respective work material components. Apparatus 10 is preferably though not necessarily formed with an open frame structure, where the containment vessels 20a, 20b are received and held by the apparatus 10 in laterally open and highly accessible manner. In the illustrated example, the containment vessels 20a, 20b are provided as paired parts of a composite vessel, with their respective dispensing tips converging for mixed or otherwise joint release of the work material components they separately store. When apparatus 10 is operated, it drives the extrusive dispensing of the work material components from these containment vessels 20a, 20b out through a jointly disposed or shared dispensing tip.

Generally, apparatus 10 includes a base portion 100 which among other things defines a handle 120 and a control member 130. Apparatus 10 also includes a cage portion 200 coupled to the base portion 100 to extend longitudinally therefrom, which cage portion 200 defines a receiving compartment 205 for receiving one or more containment vessels (such as the vessels 20a, 20b). Apparatus 10 further includes a drive portion 300 coupled to the base portion 100, which is actuated to advance forward responsive to user activation of the control member 130 to selectively drive extrusion of the work material from one or more containment vessels 20a, 20b received in the cage portion 200. Apparatus 10 additionally includes a clasp portion 400 displaceably coupled to the cage portion 200, which is displaceable relative to the cage portion 200 between first and second positions thereon to provide lateral retention.

In the disclosed embodiment, the base portion 100 includes a handle 120 and a user-actuated control member 130. The control member 130 is illustratively formed in a manual configuration to be structured, for example, much as a trigger pivotally displaceable relative to the handle 120. When a user selectively squeezes the trigger, combined dispensing of work material components from the containment vessels 20a, 20b is actuated. In a manually driven configuration, for example, each time the trigger is activated an internal mechanical component within the body portion 100, such as a so-called friction plate, may grab and incrementally advance a part of the drive portion 300 forward.

The cage portion 200 is formed with a proximate end disposed adjacent the base portion 100 and an intermediate section which extends longitudinally therefrom to terminate at a distal end. The cage portion 200 in this embodiment is illustrative formed with an open frame structure, though it may be formed in other embodiments and applications with a partially enclosed cage or frame structure of any suitable type known in the art. In the open cage structure shown, the cage portion 200 includes a pair of frame members 210a, 210b defining the receiving compartment 205 therebetween. Each of the frame members 210a, 210b is formed to extend longitudinally between the proximate and distal ends of the cage portion 200.

As shown, the frame members 210a, 210b extend longitudinally to at an end plate, or bracket, 220 fastened to extend transversely between their terminal ends. The end bracket 220 is structured and arranged to serve multiple functions. First, its planar surfaces provide a stopping surface for distal ends of the containment vessels 20a, 20b for their longitudinal retention within the receiving compartment 205. Second, the end bracket 220 is shaped to receive and cradle one or more dispensing tip members 25a, 25b (either individually or as a combined/shared dispensing tip member 25) emerging from the containment vessels 20a, 20b. In this regard, the bracket 220 in the illustrated embodiment is formed to define a mouth 215 through which such dispensing tip member(s) 25, 25a, 25b pass for cradled support or laterally limiting guidance.

To provide a measure of lateral support at the terminal, distal end of the cage portion 200, particularly during loading and unloading of containment vessels in/from the receiving compartment 205, a tab 225 is preferably though not necessarily provided. The tab is formed, for example, in the embodiment shown in the form of a rigid member on which a lateral side of a cartridge, cartridge assembly, or other such containment vessel may be supported near its front tip while in a state of incomplete securement by the clasp portion. Even when in the containment vessel(s) may be in a state of full or complete securement by a closed clasp portion, the tab 225 may provide reinforced support near its/their front tip(s).

Each of the frame members 210a, 210b is preferably formed in this embodiment as an elongate bar of substantially smooth and planar surface contours. Each is formed of a substantially rigid material such as metal, dense plastic, resin, carbon composite, and/or the like known in the art. The sectional contour and relative dimensional configurations of these frame members 210a, 210b are suitably determined according to the particular requirements of the intended application, and various other sectional contours and dimensional configurations may be employed in alternate embodiments. For example, one or more of the frame members 210a, 210b may be formed of a rod-like bar having an oblong, rounded, or any other sectional contour suitable for the particularly intended application.

The frame members 210a, 210b, as formed in this embodiment, define in effect slide rails along which the clasp portion 400 may be slidably displaced into needed position adaptively as the work material is dispensed from the containment vessels 20a, 20b. In FIG. 1, the clasp portion 400 is closed in configuration to slidably capture each frame member 210a, 210b therebetween, and drawn in position rearward against the base portion 100. The receiving compartment 205 of the cage portion 200 is then widely opened for the given containment vessels 20a, 20b to be loaded therein, as illustrated in FIG. 2, with its rearmost ends coaxially engaged by the respective plungers 320a, 320b. At that point, the clasp portion 400 may be drawn along the frame members 210a, 210a to an intermediate position thereon to laterally retain the loaded containment vessels 20a, 20b at a corresponding point intermediately along its length.

As a result, the containment vessels 20a, 20b are securely locked in place, with stable support by the clasp portion 400 against lateral escape from the receiving compartment 205. Then, as the contents of the containment vessels 20a, 20b are exhausted, and their weight becomes increasingly more concentrated forward, the clasp portion 400 may be adaptively adjusted forward to maintain stable support. That is, the point of lateral retention may be thereby shifted forward to remain at or near the containment vessels' effective center of mass or center of gravity.

The drive portion 300 in the embodiment shown is equipped with a set of drive rods 310a, 310b which pass through the base portion 100 into the receiving compartment 205 of the cage portion 200. Each drive rod 310a, 310b terminates at a plunger 320a, 320b which engages a backing displaceably disposed within a given containment vessel 20a, 20b. For coordinated movement of the drive rods 310a, 310b in concert, they are fastened together by a suitably rigid stabilizing plate 315 coupled therebetween. This yields a trombone-like drive rod structure in this embodiment, which advances linearly forward and retracts linearly rearward relative to the base and cage portions 100, 200.

In a manual configuration of this embodiment, the drive portion 300 is suitably coupled to the control member 130 such that with each squeeze of the trigger-like control member 130, the drive rods 310a, 310b responsively advance incrementally to push their plungers 320a, 320b forward by a corresponding step distance further into their respective containment vessels 20a, 20b. This in turn drives the backing within the outer tubular housing of each containment vessel 20a, 20b to squeeze work material therefrom. In an automatic configuration of this embodiment, the drive rods are driven by actively powered measures of any suitable type known in the art to advance forward when the control member 130 is squeezed or otherwise manipulated to effect the forced dispensing of work material from the containment vessels 20a, 20b.

As described in preceding paragraphs, the clasp portion 400 is displaceably coupled to the cage portion 200 for selective displacement between first and second positions, where at least one of those positions is disposed somewhere along the intermediate section of the cage portion 200. Preferably, the clasp portion is coupled for slidable displacement along the longitudinal length of the cage portion 200. In the embodiment shown, for example, the clasp portion 400 may be slidably displaced from the proximate end to the distal end of the cage portion 200, to be positioned at any intermediate point therebetween. The clasp portion 400 is thereby continually adjustable to be placed at any point along the longitudinal length of the cage portion 200, as needed.

The clasp portion 400 is formed to establish a displaceable cuff structure for laterally retaining the containment vessel(s) loaded in the cage portion's receiving compartment 205. As such, it forms a looping structure configured with an internal shape (when viewed from a sectional perspective) that provides ample clearance for the containment vessel(s) to remain loaded in place within the receiving compartment 205 without disturbance. The clasp portion 400 is thus formed with at least one somewhat bulbously contoured part which spans the receiving compartment 205 transversely yet fits comfortably around and about the outer profile of the one or more containment vessels loaded therein. In the embodiment shown, two laterally opposed parts of the clasp portion 400 form intercoupled collar members 410a, 410b which are suitably contoured to extend about the containment vessels' outer walls in this way to traverse the space between the frame members 210a, 210b.

At least one of the collar members 410a, 410b includes a body section extending between first and second clip sections, where the body section defines a bulbous profile configured to traverse the receiving compartment 205 while extending laterally about the containment vessels 20a, 20b received therein. In the embodiment shown, the collar members 410a, 410b are preferably though not necessarily structured identically and configured for releasably locked mutual engagement when intercoupled in complementary orientation relative to one another.

Thus, each of the collar members 410a, 410b includes a body section 411a, 411b extending between a first clip section 412a, 412b at one end and a second clip section 414a, 414b at another end. The body section 411a, 411b is formed to define a substantially U-shaped profile such that it extends laterally enough to preserve comfortable clearance for the loaded containment vessels 20a, 20b, while spanning the receiving compartment 205 (or a substantial portion thereof) transversely between the first and second clip sections 412a, 412b and 414a, 414b. Each collar member 410a, 410b serves as a slidable guard band across one lateral side of the loaded containment vessels' midsections. Joined together, the collar members 410a, 410b form a slidably adjustable cuffing structure for the containment vessels 20a, 20b, keeping them loaded safe and securely in the receiving compartment of the applicator apparatus during use.

Figure 4:
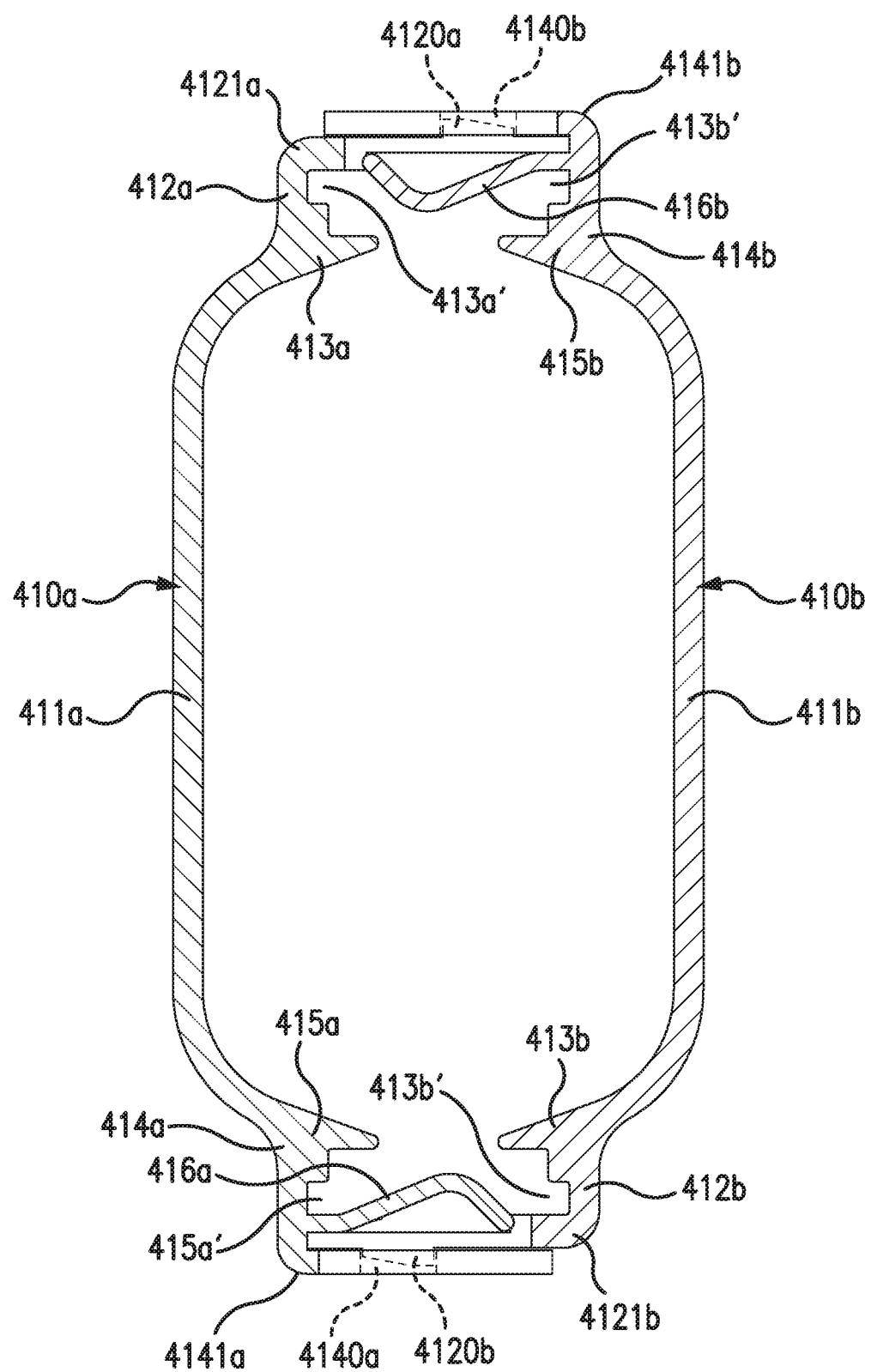
FIG. 4 is a sectional view of a portion of the embodiment of FIG. 1 as formed by a pair of complementarily disposed pair of detachably interlocked members.
Figure 5:
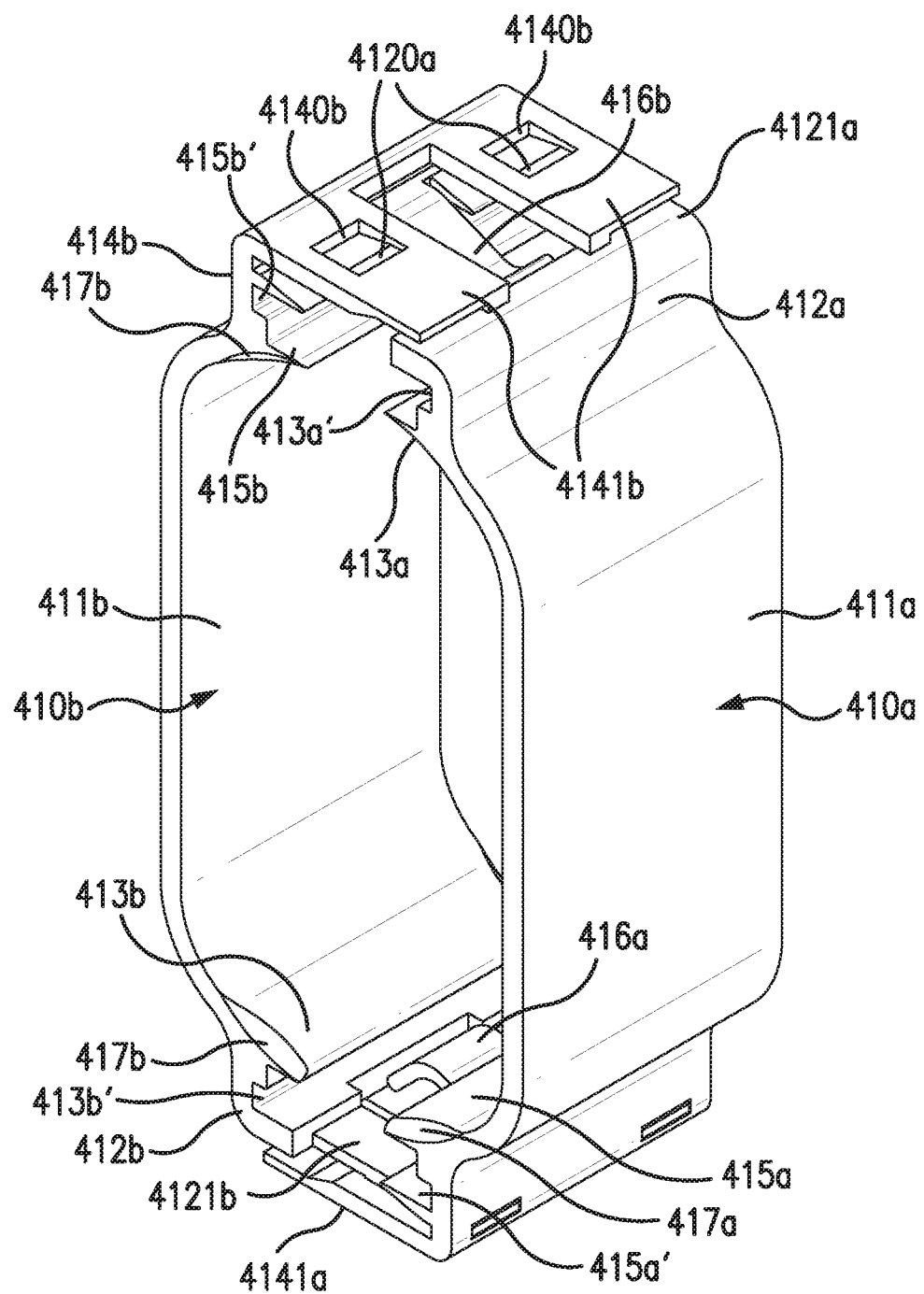
FIG. 5 is a perspective view of the portion shown in FIG. 4.
Figure 6:
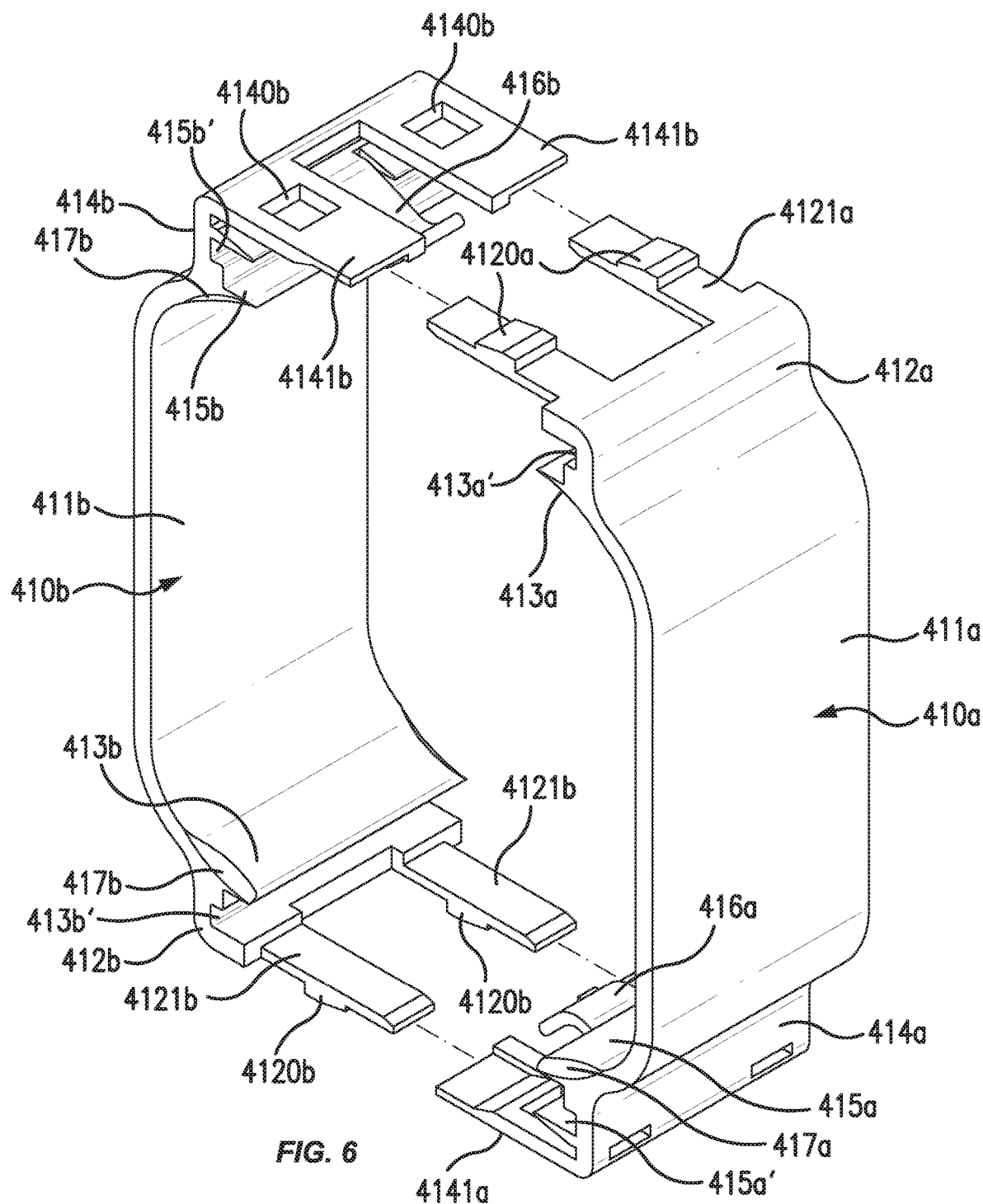
FIG. 6 is an exploded perspective view of the portion shown in FIG. 4, illustrating detachable interlocking of the members thereof.

As illustrated more clearly in FIGS. 4-6, the first clip section 412a, 412b and the second clip section 414a, 414b of each collar member are preferably of complementary interlocking configuration in the embodiment shown. For example, the first clip section 412a, 412b may be formed to include one or more male connector prongs 4121a, and the second clip section 414a, 414b may be formed to include one or more receptive female connector sockets 4141a, 4141b for mated intercoupling therewith, or vice versa. When two identical collar members 410a, 410b formed this way are to be coupled to one another, then, they may be joined together as shown—with the first clip section 412a, 412b of one opposing the second clip section 414b, 414a of the other. The two collar members 410a, 410b, complementarily paired together in this manner, may then be snap-fit to one another to capture the frame members 210a, 210b therebetween in releasably interlocked manner.

The clasp portion 400 is therefore reconfigurable between closed and open configurations. In its closed configuration, the clasp portion is releasably locked to maintain resiliently biased engagement of the cage portion 200. When it is to be re-positioned along the cage portion 200, that resilient bias is overcome by sufficient applied force and the clasp portion 400 accordingly displaced.

The clasp portion 400 (or at least suitable portion(s) thereof) is preferably formed with a combination of material composition and structural configuration such that on the one hand, when in its closed or engaging configuration on the cage portion 200, it engages with sufficient force and grip (frictional or otherwise) to maintain a selected position thereon. On the other hand, the clasp portion 400 (or at least suitable portion(s) thereof) is formed such that it may be slidably repositioned along the cage portion 200 to maintain another selected position, without requiring undue physical exertion by a user to do so.

Towards those and other ends, each of the collar members 410a, 410 of the clasp portion 400 in the illustrated embodiment is preferably formed of a dense plastic, resin, carbon composite, or other material known in the art. Such material compositions combine with the structural features employed to yield a suitable degree of resilience and friction to provide static grip, while maintaining dynamic slidability on the corresponding surfaces of the cage portion 200. One example of a durable type plastic material offering suitable coefficient of friction on metal and other plastic surfaces for use in this regard is a Polyoxymethylene (POM) material commercially known as DELRIN. Examples of other materials of suitable type may include ULTRAFORM and CELCON materials, among others.

The clasp portion 400 is thereby formed to be slidably displaceable along the frame members 210a, 210b responsive to user application of a force sufficient to overcome the frictional engagement against those frame members 210a, 210b when disposed at a set position. Then, when the user releases the clasp portion 400 after re-positioning, it resumes its frictional engagement against those frame members 210a, 210b at the new position.

Each clip section of at least one of the collar members 410a, 410b accordingly forms a slide groove which slidably engages an edge of one frame member 210a, 210b. Preferably, both of the collar members 410a, 410b are so formed with their first and second clip sections each forming a slide groove 413a', 413b', 415a', 415b'. The inner surfaces of the collar members 410a, 410b are preferably formed with extensions 413a, 415a, 413b, 415b at the first and second clip sections. These extensions 413a, 415a, 413b, 415b serve to partition the slide grooves from the containment vessels, and substantially conform to the containment vessels' outer surface contours.

When the clasp portion 400 is slid along the frame members 210a, 210b, the inner surfaces of the clasp portion—including these surface extensions 413a, 415a, 413b, 415b move either in closely spaced or slidably contacting manner along the containment vessels' outer surfaces. To reduce the risk of potential catching or snagging during that process, one or more of these surface extensions 413a, 415a, 413b, 415b is formed with a tapered deflecting surface 417a, 417b at its side edges adjacent/closest to the containment vessels. These proximate and distal edges at longitudinally opposed peripheral sides of the clip sections' surface extensions become leading edges when the collar members 410a, 410b are moved forward or rearward past the containment vessels.

Since each of the proximate and distal edges extend peripherally along the first and second clip sections and the body section of the given collar member, at least one of said proximate and distal edges is formed with such tapered deflecting surface 417a, 417b suitably configured to provide leading edge guidance over potential interference or snagging hazards on the containment vessels. Each tapered deflecting surface 417a, 417b, which for example may form a ramp-like inclined surface as in the illustrated embodiment, thus serves to deflect and guide its collar member's continued movement past such potential interference or snagging hazards as surface irregularities, deformities, discontinuities, debris, or the like.

At least one collar member 410a, 410b includes a clip section formed with a leaf spring extension 416a, 416b which is resiliently biased to press against a frame member 210a, 210b, preferably to provide frictional resistance when the clasp portion 400 is in its closed configuration. In certain alternate embodiments, the resiliently biased engagement may be against a suitable catching, stopping, latching, or other structure for locking the clasp portion 400 in place until and unless the resilient bias is overcome to release the lock.

Preferably, the resiliently biased frictional engagement is provided against each of the frame members 210a, 210b to maximize stability and security. Since the collar members 410a, 410b are of identical structure in the illustrated embodiment, their complementary intercoupling means that each collar member will so engage one of the frame members 210a, 210b. As a result, both will be engaged in this manner collectively by the clasp portion 400.

The collar members 410a, 410b joined together are interlocked by the complementary prongs 4121a, 4121b and sockets 4141b, 4141a. As illustrated clearly in the sectional view of FIG. 4, the prongs 4121a, 4121b are matedly received by corresponding sockets 4141b, 4141a. One of the matedly coupled prong and socket pair is preferably formed with a surface protuberance (4120a, 4120b) while the other is formed with a matching window or recess (4140a, 4140b) that the protuberance may engage when the pair are fully coupled. This serves to releasably interlock the prong and socket pair's coupling, and in turn the joined collar members' intercoupling. The reliance inherent in the cantilevered structure of the prongs and sockets permits them to be snap-fit coupled and decoupled to/from one another.

Figure 7:
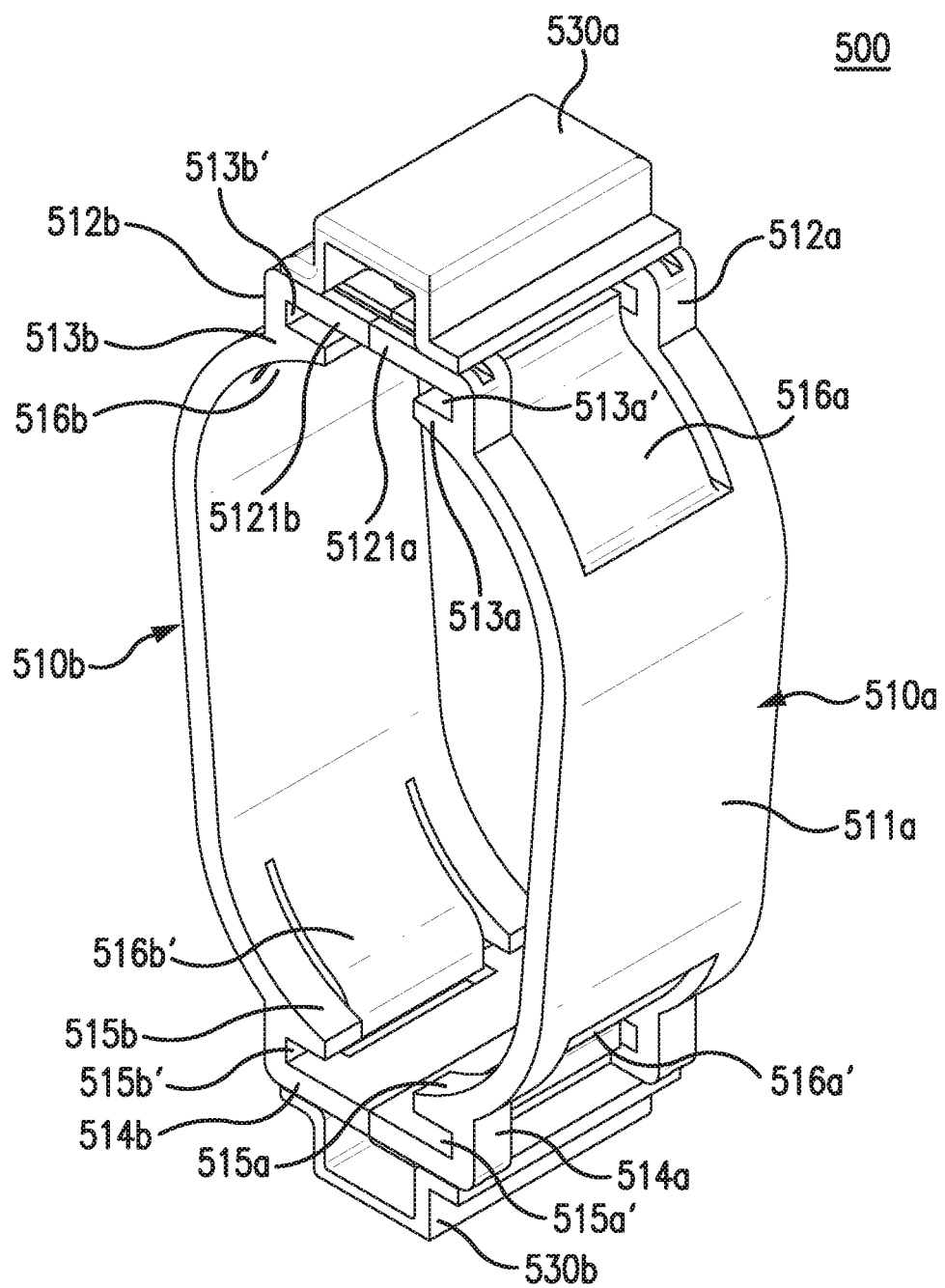
FIG. 7 is a perspective view of a portion of an apparatus formed in accordance with another exemplary embodiment of the present invention, as formed by a pair of disposed pair of members intercoupled in releasably locked manner.
Figure 8:
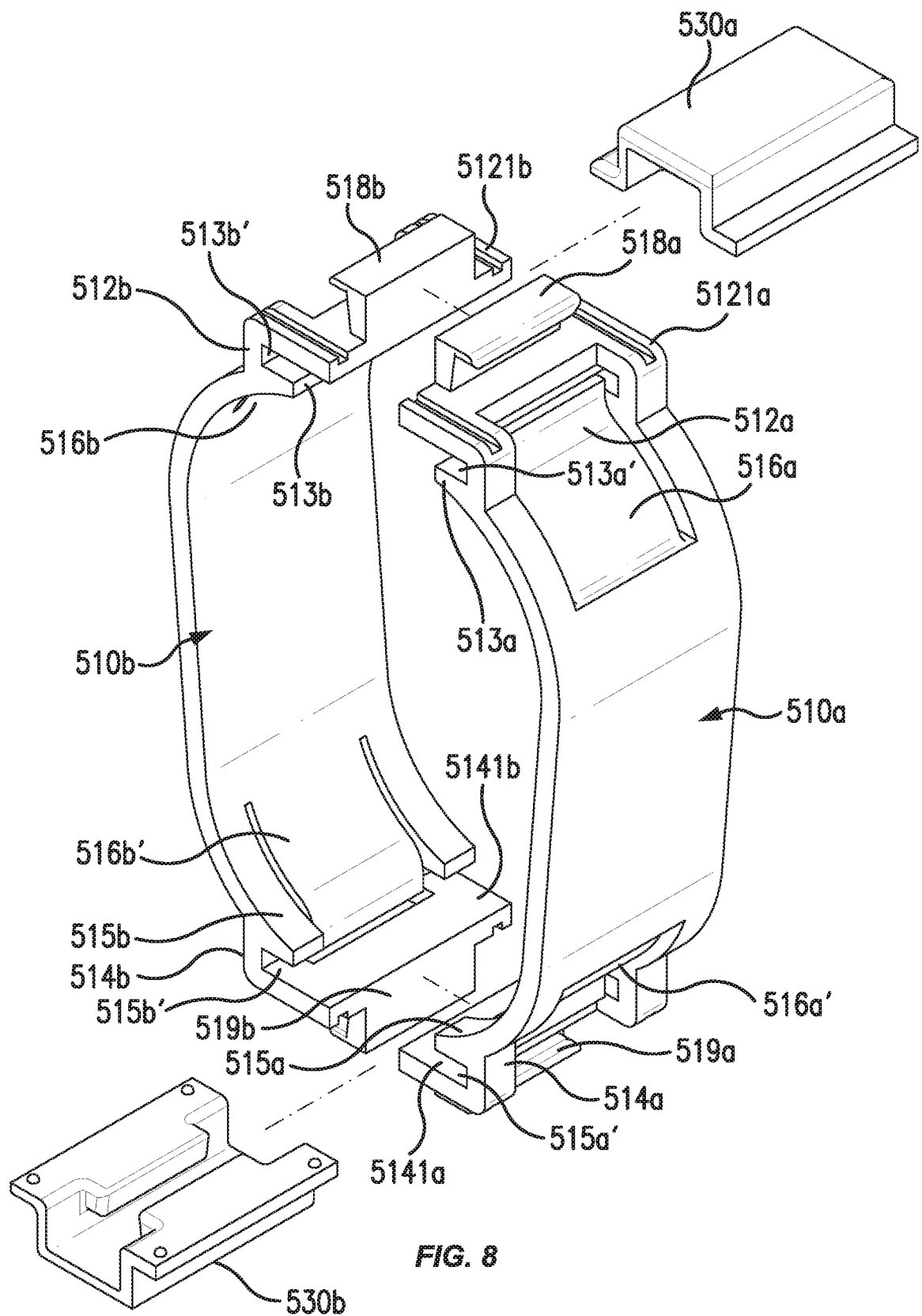
FIG. 8 is an exploded perspective view of the portion shown in FIG. 7, illustrating releasable locking of the members thereof; and, FIG. 9 is a sectional view of the portion shown in FIG. 7, illustrating an uneven profile defined by the intercoupled members thereof.
Figure 9:
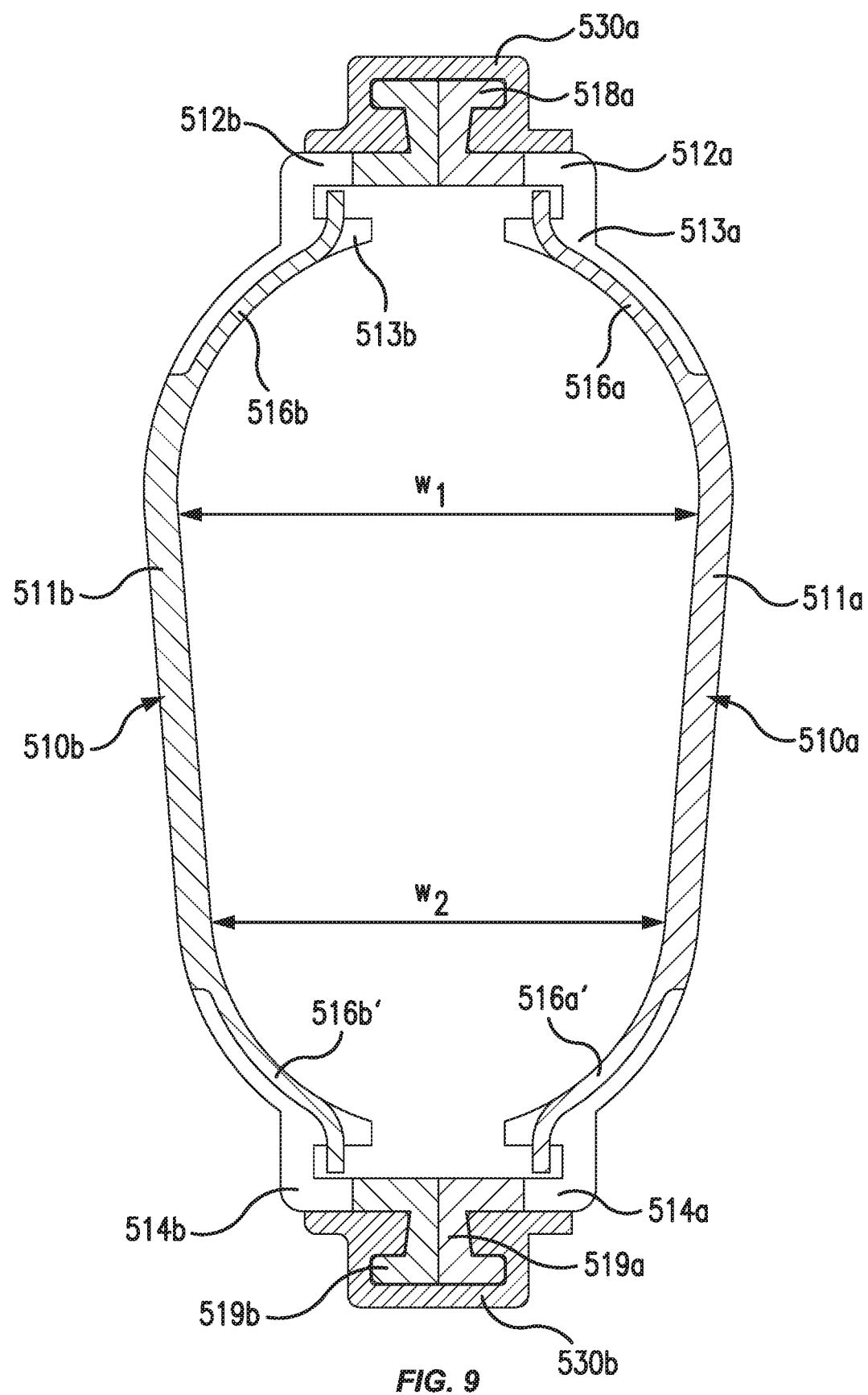

Turning now to FIGS. 7-9, there are shown various views of a clasp portion 500 formed in accordance with another exemplary embodiment of the present invention for use as an alternative to the clasp portion embodiment 400 in the applicator apparatus 10 shown in FIGS. 1-3. In this embodiment, the clasp portion 500 also includes two laterally opposed collar members 510a, 510b which are suitably contoured to extend about the containment vessels' outer walls to traverse the space between the frame members 210a, 210b of the cage portion 200. Each of the collar members 510a, 510b is formed with a body section 511a, 511b extending between first and second clip sections 512a, 514a and 512b, 514b, with the body section defining a bulbous profile configured to traverse the receiving compartment 205 while extending laterally about the containment vessels 20a, 20b received therein. In this embodiment also, the collar members 510a, 510b are preferably though not necessarily structured identically. They are configured for releasably locked mutual engagement when joined facing each other without having to orient them in flipped, or complementary, manner relative to one another.

The clasp portion 500 in this embodiment is configured to accommodate one or more containment vessels that may not necessarily present an even, or balanced, outer profile. For instance, two containment vessels may be loaded into the receiving compartment 205 of the applicator apparatus 10, where one containment vessel is wider in diametric dimension (transverse to the longitudinal/axial direction defined by the cage portion 200) than the other. More lateral clearance, and possibly a different inner surface contour, may be necessary for the clasp portion 500, then, to accommodate the uneven outer surface profile collectively defined by the loaded containment vessels.

As illustrated in the sectional view of FIG. 9, the body sections 511a, 511b is shaped such that when the collar members 510a, 510b are joined together, they cooperatively encompass a containment compartment 205 having a lateral space width W1 defined nearer to one of the frame members 210a, 210b that is wider, for example, than a comparable lateral space width W2 defined nearer to the other of the frame members 210a, 210b. The body sections 511a, 511b of the joined collar members thus form an unbalanced bulbous profile having a point of maximum lateral extension disposed closer to one of said frame members 210a, 210b than to the other of said frame members 210a, 210b. The unbalanced profile in the example illustrated is asymmetric along a transverse direction spanning the receiving compartment from one frame member to the other. The body sections of the joined collar members in other alternate embodiments may form various other looping, cuffing profiles to encompass the outer surfaces of variously shaped and sized containment vessels loaded in the receiving compartment of the applicator apparatus.

The collar members 510a, 510b (and 410a, 410b in the preceding embodiment) are preferably contoured internally like this to substantially conform to the variously shaped and sized containment vessels somewhat snuggly. But ample clearance is preserved for unhindered displacement of the clasp portion 500 (and 400) along the longitudinal length of the loaded containment vessel(s) when it is re-positioned. In many applications, multiple containment vessels of disparate size and/or shape are indeed concurrently loaded into the receiving compartment 205. The unbalanced profile of the clasp portion accommodates such applications, providing sufficiently close cuff about the irregular lateral/transverse profiles they present.

Typically, in the case of multiple co-loaded containment vessels, it is may be sufficient that at least the larger-profiled containment vessel be securely cuffed. The smaller-profiled containment vessel may be secured to the other containment vessel, or the play/residual relative movement of the smaller-profile containment vessel may not be a significant enough factor to destabilize retention. But if the clasp portion's lack of conformed retention of the smaller-profile containment vessel becomes a potentially material factor, a suitably shaped and sized insert or auxiliary clip member may be employed to take up the residual space between the smaller-profile containment vessel and the surrounding clasp portion.

The collar members 510*a*, 510*b* are also formed without complementary clip sections for mutual interlocking as in the clasp portion 400. Instead, each of the mutually opposed clip sections 512*a*/512*b* and 514*a*/514*b* of the joined collar members forms a base member 5121*a*/5121*b* and 5141*a*/5141*b* from which an anchor member 518*a*/518*b*, 519*a*/519*b* protrude. To join the collar members 510*a*, 510*b* together, their mutually opposed clip sections 512*a*/512*b* and 514*a*/514*b* are brought together in alignment to squarely abut one another, as shown. Removable clip brackets 530*a*, 530*b* are then slidably installed over the base members 5121*a*/5121*b* and 5141*a*, 5141*b* at the joinder of respective clip sections to lockingly engage the anchor members 518*a*/518*b* and 519*a*/519*b* brought together there.

The clip brackets 530*a*, 530*b* thus releasably interlock the matched pairs of clip sections, hence the coupled collar members 510*a*, 510*b*, together. The clasp portion 500 is thereby locked in its closed configuration, capturing the frame members 210*a*, 210*b* therebetween. To open the clasp portion 500, the clip brackets 530*a*, 530*b* are removed to free the matched clip sections for separation, such that the collar members 510*a*, 510*b* may be decoupled from one another.

Each collar member 510*a*, 510*b* in this embodiment is formed with a plurality of engagement members for resiliently biased engagement of both frame members 210*a*, 210*b*. The collar members 510*a*, 510*b* include a leaf spring extension 516*a*, 516*b* and 516*a*', 516*b*' at each of its clip sections. These spring leaf spring extensions 516*a*, 516*b* and 516*a*', 516*b*' are each resiliently biased to press against one of the frame members 210*a*, 210*b* when the collar members are situated thereon and interlocked. Each is formed as part of a clip section, but extends in this embodiment from the body section 511*a*, 511*b* as shown, for ample size and elastic strength to provide frictional resistance when the clasp portion 500 is disposed in its closed configuration about the frame members 210*a*, 210*b*. They cooperatively provide dual balanced engagement of each frame member 210*a*, 210*b* from both lateral sides when the clasp portion 500 is set in place along the longitudinal length of the loaded containment vessels.

Each clip section of at least one collar member 510*a*, 510*b* in this embodiment forms a slide groove for slidably engaging an edge of one frame member 210*a*, 210*b*. Preferably, both of the collar members 510*a*, 510*b* are so formed with their first and second clip sections each forming a slide groove 513*a*', 513*b*', 515*a*', 515*b*'. The inner surfaces of the collar members 510*a*, 510*b* are preferably formed with extensions 513*a*, 515*a* and 513*b*, 515*b* at their first and second clip sections. These extensions 513*a*, 515*a*, 513*b*, 515*b* serve to partition the slide grooves from the loaded containment vessels, and substantially conform to the containment vessels' outer surface contours.

In the illustrated embodiments, the clasp portion 400, 500 is shown with collar members which are intercoupled in mutually detachable manner. In certain other embodiments, such collar members may be formed in such manner that they remain secured to one another even when the clasp portion is in its open configuration. For example, the collar members of the clasp portion may be joined to one another by one or more living hinge structures of suitable type known in the art, so as to be displaceable or deflectable relative to one another, though they may not fully break apart from one another. Moreover, one or both of the collar members may be equipped with a push tab or other such user-manipulable structure, whereby the clasp portion is released from a locked position along the cage portion 200 for re-positioning displacement therealong.

The various portions, parts, and components of the applicator apparatus disclosed herein may be formed of any suitable material(s) known in the art for the particular requirements of the intended applications. For example, metallic, plastic, rubber, and other such materials may be suitably employed in view of such factors as the required combination of strength, rigidity, weight, frictional properties, and the like. The present invention is not limited to any particular choice of such material compositions or their combinations.

Although this invention has been described in connection with specific forms and embodiments thereof, it will be appreciated that various modifications other than those discussed above may be resorted to without departing from the spirit or scope of the invention as defined herein. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined herein.

What is claimed is:

1. An applicator apparatus for extrusively dispensing work material from a containment vessel received thereby, comprising:
   a base portion including a handle and a control member;
   an end bracket longitudinally spaced from said base portion;
   a cage portion coupled to said base portion on one end thereof and said end bracket on an opposing end, said cage portion forming a longitudinally extended open frame structure between said base portion and said end bracket, said cage portion defining a receiving compartment for at least one containment vessel;
   a drive portion coupled to said base portion, said drive portion being actuated responsive to said control member for driving extrusion of the work material from the containment vessel; and,
   a clasp portion displaceably coupled to said cage portion, said clasp portion being longitudinally displaceable relative to said cage portion between first and second positions, the first position being adjacent to said base portion and the second position being disposed at a location longitudinally displaced from the first position, said clasp portion forming a cuff circumscribing the receiving compartment of said cage portion and thereby laterally retaining the containment vessel received therein.

2. The applicator apparatus as recited in claim 1, wherein said clasp portion is slidably coupled to said cage portion for slidable adjustment between the first and second positions.

3. The applicator apparatus as recited in claim 2, wherein said clasp portion is reconfigurable between closed and open configurations, said clasp portion in the closed configuration being releasably locked to maintain resiliently biased engagement of said cage portion.

4. The applicator apparatus as recited in claim 2, wherein said clasp portion includes first and second collar members detachably coupled to one another to capture said cage portion therebetween.

5. The applicator apparatus as recited in claim 4, wherein said first and second collar members are identical in structure, said first and second collar members being configured for releasably locked mutual engagement when intercoupled in complementary orientation relative to one another.

6. An applicator apparatus for extrusively dispensing work material from a containment vessel received thereby, comprising:
    a base portion including a handle and a control member;
    a cage portion coupled to said base portion, said cage portion defining a receiving compartment for at least one containment vessel, the cage portion having a proximate end disposed adjacent said base portion and an intermediate section extending to a distal end longitudinally therefrom;
    a drive portion coupled to said base portion, said drive portion being actuated responsive to said control member for driving extrusion of the work material from the containment vessel; and,
    a clasp portion displaceably coupled to said cage portion, said clasp portion being slidably coupled to said cage portion for slidable adjustment relative to said cage portion between the first and second positions, the second position being disposed along said intermediate section of said cage portion, said clasp portion forming a cuff about the receiving compartment of said cage portion for laterally retaining the containment vessel received therein, said clasp portion including first and second collar members detachably coupled to one another to capture said cage portion therebetween, wherein at least said first collar member includes a body section extending between first and second clip sections, said body section defining a bulbous profile configured to traverse the receiving compartment while extending laterally about the containment vessel received therein, at least one of said first and second clip section including a leaf spring extension resiliently biased to press against said cage portion for frictional resistance when said clasp portion is in the closed configuration.

7. An applicator apparatus for extrusively dispensing work material from a containment vessel received thereby, comprising:
    a base portion including a handle and a control member;
    a cage portion coupled to said base portion, said cage portion defining a receiving compartment for at least one containment vessel, the cage portion having a proximate end disposed adjacent said base portion and an intermediate section extending to a distal end longitudinally therefrom;
    a drive portion coupled to said base portion, said drive portion being actuated responsive to said control member for driving extrusion of the work material from the containment vessel; and,
    a clasp portion displaceably coupled to said cage portion, said clasp portion being slidably coupled to said cage portion for slidable adjustment relative to said cage portion between the first and second positions, the second position being disposed along said intermediate section of said cage portion, said clasp portion forming a cuff about the receiving compartment of said cage portion for laterally retaining the containment vessel received therein, said clasp portion including first and second collar members detachably coupled to one another to capture said cage portion therebetween,
wherein:
    said cage portion forms an open frame structure, said cage portion includes a pair of frame members defining the receiving compartment therebetween, each of said frame members extending longitudinally between the proximate and distal ends;
    at least said first collar member includes a body section extending between first and second clip sections, said body section defining a bulbous profile configured to traverse the receiving compartment while extending laterally about the containment vessel received therein; and,
    each of said first and second clip sections of said first collar member forms a slide groove slidably engaging one of said frame members, said clasp portion being thereby slidably displaceable along said frame members responsive to user applied force sufficient to overcome a resiliently biased frictional engagement against said frame members.

8. The applicator apparatus as recited in claim 7, wherein said first collar member defines proximate and distal edges at longitudinally opposed peripheral sides thereof, each of said proximate and distal edges extending peripherally along said first and second clip sections and said body section of said first collar member, at least one of said proximate and distal edges having formed thereon a tapered deflecting surface configured to provide leading edge guidance over snagging hazards on the containment vessel when the clasp portion is displaced in a longitudinal direction along said cage portion.

9. The applicator apparatus as recited in claim 7, wherein each of said first and second collar members includes said first and second clip sections and said body section extending therebetween, said body section defining an unbalanced bulbous profile having a point of maximum lateral extension disposed closer to one of said frame members than to the other of said frame members.

10. The applicator apparatus as recited in claim 4, wherein each of said first and second collar members includes a body section extending between first and second clip sections, said body section defining a substantially U-shaped profile configured to traverse the receiving compartment while extending laterally about the containment vessel received therein.

11. An applicator apparatus for extrusively dispensing work material from a containment vessel retained in adaptively adjustable manner thereby, comprising:
    a base portion including a handle and a control member;

an end bracket longitudinally spaced from said base portion;

a cage portion coupled to said base portion on one end thereof and said end bracket on an opposing end, said cage portion forming a longitudinally extended open frame structure between said base portion and said end bracket, said cage portion defining a receiving compartment for at least one containment vessel;

a drive portion coupled to said base portion, said drive portion being actuated responsive to said control member for driving extrusion of the work material from the containment vessel; and, a clasp portion slidably coupled to said cage portion to be displaceable between first and second positions on said cage portion, the first position being adjacent to said base portion and the second position being disposed at a location longitudinally displaced from the first position, wherein:

said clasp portion forms a cuff substantially circumscribing the receiving compartment of said cage portion and thereby laterally retains the containment vessel received therein; and, said clasp portion is reconfigurable between closed and open configurations, said clasp portion in the closed configuration being releasably locked to maintain resiliently biased engagement of said cage portion.

12. The applicator apparatus as recited in claim 11, wherein said clasp portion includes first and second collar members detachably coupled to one another to capture said cage portion therebetween.

13. The applicator apparatus as recited in claim 12, wherein:

said first and second collar members are identical in structure and configured for releasably locked mutual engagement when intercoupled in complementary orientation relative to one another; and, said receiving compartment of said cage portion is configured to concurrently receive a plurality of longitudinally extended containment vessels therein.

14. An applicator apparatus for extrusively dispensing work material from a containment vessel retained in adaptively adjustable manner thereby, comprising:

a base portion including a handle and a control member;

a cage portion coupled to said base portion, said cage portion defining a receiving compartment for at least one containment vessel, the cage portion having a proximate end disposed adjacent said base portion and an intermediate section extending to a distal end longitudinally therefrom;

a drive portion coupled to said base portion, said drive portion being actuated responsive to said control member for driving extrusion of the work material from the containment vessel; and, a clasp portion slidably coupled to said cage portion to be displaceable between first and second positions on said cage portion, the second position being disposed along said intermediate section of said cage portion, wherein:

said clasp portion forms a cuff substantially looped about the receiving compartment of said cage portion for laterally retaining the containment vessel received therein; and, said clasp portion is reconfigurable between closed and open configurations, said clasp portion in the closed configuration being releasably locked to maintain resiliently biased engagement of said cage portion, wherein said clasp portion includes first and second collar members detachably coupled to one another to capture said cage portion therebetween, wherein:

said first and second collar members are identical in structure and configured for releasably locked mutual engagement when intercoupled in complementary orientation relative to one another; and, said receiving compartment of said cage portion is configured to concurrently receive a plurality of longitudinally extended containment vessels therein, and wherein at least said first collar member includes a body section extending between first and second clip sections, said body section defining a bulbous profile configured to traverse the receiving compartment while extending laterally about the containment vessel received therein, at least said first clip section including a leaf spring extension resiliently biased to press against said cage portion for frictional resistance when said clasp portion is in the closed configuration.

15. An applicator apparatus for extrusively dispensing work material from a containment vessel retained in adaptively adjustable manner thereby, comprising:

a base portion including a handle and a control member, a cage portion coupled to said base portion, said cage portion defining a receiving compartment for at least one containment vessel, the cage portion having a proximate end disposed adjacent said base portion and an intermediate section extending to a distal end longitudinally therefrom;

a drive portion coupled to said base portion, said drive portion being actuated responsive to said control member for driving extrusion of the work material from the containment vessel; and, a clasp portion slidably coupled to said cage portion to be displaceable between first and second positions on said cage portion, the second position being disposed along said intermediate section of said cage portion, wherein:

said clasp portion forms a cuff substantially looped about the receiving compartment of said cage portion for laterally retaining the containment vessel received therein; and, said clasp portion is reconfigurable between closed and open configurations, said clasp portion in the closed configuration being releasably locked to maintain resiliently biased engagement of said cage portion, and wherein said clasp portion includes first and second collar members detachably coupled to one another to capture said cage portion therebetween, wherein:

said cage portion forms an open frame structure, said cage portion includes a pair of frame members defining the receiving compartment therebetween, each of said frame members extending longitudinally between the proximate and distal ends;

said first and second collar members each including a body section extending between first and second clip sections, said body section defining a bulbous profile configured to traverse the receiving compartment while extending laterally about the containment vessel received therein; and, each of said first and second clip sections forms a slide groove slidably engaging one of said frame members, said clasp portion being thereby slidably displaceable along said frame members responsive to user applied force sufficient to overcome the frictional engagement of said leaf spring extension against said frame members.

16. The applicator apparatus as recited in claim 15, wherein each of said first and second collar members defines proximate and distal edges at longitudinally opposed peripheral sides thereof, each of said proximate and distal edges extending peripherally along said first and second clip sections and said body section of said first collar member, at least one of said proximate and distal edges having formed thereon a tapered deflecting surface configured to provide leading edge guidance over snagging hazards on the containment vessel when the clasp portion is displaced in a longitudinal direction along said cage portion.

17. The applicator apparatus as recited in claim 15, wherein said body section of each said first and second collar member defines a substantially U-shaped profile configured to traverse the receiving compartment while extending laterally about the containment vessel received therein.

18. The applicator apparatus as recited in claim 15, wherein said body section of each said first and second collar member defines an unbalanced bulbous profile having a point of maximum lateral extension disposed closer to one of said frame members than to the other of said frame members.

19. An applicator apparatus having continually adjustable retention of a containment vessel for extrusively dispensing work material therefrom, comprising:
 a base portion including a handle and a control member;
 a cage portion coupled to said base portion, said cage portion defining a receiving compartment for at least one containment vessel, the cage portion forming an open frame structure including a pair of frame members defining the receiving compartment therebetween, each of said frame members extending longitudinally from a proximate end disposed adjacent said base portion to terminate at a distal end;
 a drive portion coupled to said base portion, said drive portion being actuated responsive to said control member for driving extrusion of the work material from the containment vessel; and,
 a clasp portion slidably coupled to said cage portion to be displaceable between first and second positions on said cage portion, the second position being disposed along said intermediate section of said cage portion, wherein:
  said clasp portion is reconfigurable between closed and open configurations, said clasp portion in the closed configuration being releasably locked to maintain resiliently biased engagement of said cage portion;
  said clasp portion includes first and second collar members detachably coupled to one another to capture said cage portion therebetween, said first and second collar members cooperatively forming a cuff about the receiving compartment of said cage portion for laterally retaining the containment vessel received therein; and,
  at least said first collar member includes a body section extending between first and second clip sections, said body section defining a bulbous profile configured to traverse the receiving compartment while extending laterally about the containment vessel received therein, at least said first clip section including a leaf spring extension resiliently biased to press against said cage portion for frictional resistance when said clasp portion is in the closed configuration.

20. The applicator apparatus as recited in claim 19, wherein said first and second collar members are identical in structure, said first and second collar members being configured for releasably locked mutual engagement when intercoupled in complementary orientation relative to one another.

\* \* \* \* \*